US012596036B2

(12) United States Patent
Reuvers

(10) Patent No.: US 12,596,036 B2
(45) Date of Patent: Apr. 7, 2026

(54) TEMPERATURE PROBE

(71) Applicant: Rosemount Inc., Shakopee, MN (US)

(72) Inventor: John L. Reuvers, Minneapolis, MN (US)

(73) Assignee: Rosemount Inc., Shakopee, MN (US)

( * ) Notice: Subject to any disclaimer, the term of this patent is extended or adjusted under 35 U.S.C. 154(b) by 778 days.

(21) Appl. No.: 17/487,750

(22) Filed: Sep. 28, 2021

(65) Prior Publication Data

US 2023/0096651 A1 Mar. 30, 2023

(51) Int. Cl.
*G01K 1/08* (2021.01)
*G01K 7/22* (2006.01)

(52) U.S. Cl.
CPC ...... *G01K 1/08* (2013.01); *G01K 7/22* (2013.01)

(58) Field of Classification Search
CPC .. G01K 1/08; G01K 7/22; G01K 1/16; G01K 1/14; G01K 1/143
See application file for complete search history.

(56) References Cited

U.S. PATENT DOCUMENTS

| | | | | |
|---|---|---|---|---|
| 3,592,059 | A | * | 7/1971 | Chilton ................. G01K 13/20 374/E13.002 |
| 4,085,398 | A | * | 4/1978 | Bertram ................. H01C 7/021 374/E7.018 |
| 4,934,831 | A | | 6/1990 | Volbrecht |
| 4,971,452 | A | | 11/1990 | Finney |

| | | | |
|---|---|---|---|
| 7,719,401 | B2 | 5/2010 | Nyffenegger |
| 7,982,580 | B2 | 7/2011 | Weber et al. |
| 9,958,336 | B2 | 5/2018 | Ihle et al. |
| 2002/0135455 | A1 | 9/2002 | Murata et al. |
| 2009/0296781 | A1 | 12/2009 | Weber et al. |
| 2018/0202866 | A1 | 7/2018 | Dixneuf et al. |
| 2021/0223113 | A1 | 7/2021 | Pecquet et al. |

FOREIGN PATENT DOCUMENTS

| | | |
|---|---|---|
| CN | 102047087 A | 5/2011 |
| CN | 203824685 U | 9/2014 |
| CN | 106441624 A | 2/2017 |

(Continued)

OTHER PUBLICATIONS

Translation of CN107271065A (2017).*

(Continued)

*Primary Examiner* — Mirellys Jagan
(74) *Attorney, Agent, or Firm* — Christopher R. Christenson; Kelly, Holt & Christenson, P.L.L.C.

(57) ABSTRACT

A temperature probe includes a mineral-insulated cable having a metallic outer sheath surrounding a mineral insulation therein. The mineral-insulated cable has a plurality of conductors running through the mineral insulation. A temperature sensitive element has a pair of lead wires. An insert has at least one conduit to receive the pair of lead wires of the temperature sensitive element. The insert also has a recess configured to receive the temperature sensitive element. An insert sheath is configured to slide over the insert and has a first end configured to couple to the metallic outer sheath of the mineral-insulated cable and a second end. An endcap is attached to the second end of the insert sheath. The insert is configured to urge the temperature sensitive element into contact with the endcap.

17 Claims, 8 Drawing Sheets

(56) References Cited

FOREIGN PATENT DOCUMENTS

| CN | 107110711 | A | | 8/2017 | | |
|----|-----------|-----|---|---------|---|---------|
| CN | 107110713 | A | | 8/2017 | | |
| CN | 107271065 | A | * | 10/2017 | .............. | G01K 1/08 |
| CN | 108020340 | A | * | 5/2018 | .............. | G01K 1/14 |
| CN | 108204863 | A | | 6/2018 | | |
| CN | 208060039 | U | | 11/2018 | | |
| CN | 106996837 | B | | 1/2019 | | |
| CN | 107271065 | B | | 12/2019 | | |
| CN | 112840190 | A | | 5/2021 | | |
| DE | 10236036 | A1 | | 2/2004 | | |
| DE | 102009026402 | A1 | * | 5/2010 | ............ | B23K 26/22 |
| EP | 1785705 | B1 | | 3/2010 | | |
| FR | 2893127 | A1 | * | 5/2007 | .............. | G01K 1/08 |
| JP | 1974-105182 | A2 | | 10/1974 | | |
| JP | 1991-118432 | A2 | | 5/1991 | | |
| JP | 2015-219102 | A2 | | 12/2015 | | |
| KR | 101626859 | B1 | * | 2/2016 | | |
| WO | 2019122036 | A1 | | 6/2019 | | |
| WO | 2020074671 | A1 | | 4/2020 | | |

OTHER PUBLICATIONS

U.S. Appl. No. 17/137,648, filed Dec. 30, 2020, Application and Drawings, 21 pages.

International Search Report and Written Opinion for PCT Application No. PCT/US2022/044359, Dated Dec. 29, 2022, 11 pages.

Office Action for Japanese Patent Application No. 2024-519029, Dated Apr. 1, 2025, 10 pages including English translation.

Office Action received for Canadian Patent Application No. #3232567, dated Apr. 11, 2025, 4 pages.

Extended European Search Report for European Application No. 22877163.0, mailed Aug. 13, 2025, 15 Pages.

First Office Action for Chinese Application No. 202211176068.6, dated May 30, 2025, 25 Pages.

Second Office Action for Chinese Application No. 202211176068.6, mailed Oct. 25, 2025, 13 Pages.

Communication Pursuant to Article 114(2) EPC for European Application No. EP22877163, dated Nov. 6, 2025, 04 Pages.

Notification of Grant of Office Action for Chinese Application No. 202211176068.6, mailed Jan. 12, 2026, 6 Pages.

Office action for Indian Application No. IN202427022299 mailed Jan. 28, 2026, 7 Pages.

* cited by examiner

SINGLE GROUNDED
TIP CONFIGURATION (SG)

SINGLE UNGROUNDED
TIP CONFIGURATION (SU)

RTD SINGLE THIN ELEMENT
CAPSULE

RTD SINGLE WIRE WOUND
CAPSULE

TEMPERATURE PROBE

BACKGROUND

Temperature probes are used in a variety of industries and environments to provide an indication of temperature of a substance or surface, such as a process fluid flowing in a process fluid conduit, such as a pipe. A temperature probe generally includes an outer sheath that is formed of metal, ceramic, or glass that protects a temperature sensitive element, located inside the sheath, from impacts and exposure to process fluids or the like. Non-conductive powder, such as Magnesium Oxide (MgO) or ceramic (such as Alumina Oxide—$Al_2O_3$) is usually used to fill the space between the inner surface of the sheath and the temperature sensitive element.

Temperature probes have a variety of design considerations that must be considered for applicability to a particular application. Among these considerations are accuracy, thermal operating range, and response time. A fast response time is a very important consideration in a number of high-precision industries, such as pharmaceuticals, food and beverage production, and custody transfer of goods. Providing a temperature probe with an improved response time would allow such temperature probes to be used in more applications, and particularly applications that require fast response times.

Resistance temperature detectors (RTD) and thermocouples (TC) are the most common industrial temperature sensing elements. Each type of temperature detector has advantages. RTDs are generally considered to be more accurate and have excellent long-term stability. Thermocouples are generally believed to be less accurate and experience more drift than RTDs, but they require less immersion into a process, have better response time, and superior vibration resistance.

SUMMARY

A temperature probe includes a mineral-insulated cable having a metallic outer sheath surrounding a mineral insulation therein. The mineral-insulated cable has a plurality of conductors running through the mineral insulation. A temperature sensitive element has a pair of lead wires. An insert has at least one conduit to receive the pair of lead wires of the temperature sensitive element. The insert also has a recess configured to receive the temperature sensitive element. An insert sheath is configured to slide over the insert and has a first end configured to couple to the metallic outer sheath of the mineral-insulated cable and a second end. An endcap is attached to the second end of the insert sheath. The insert is configured to urge the temperature sensitive element into contact with the endcap and to provide strain relief between the leadwires and the element.

DETAILED DESCRIPTION OF ILLUSTRATIVE EMBODIMENTS

While embodiments of the present invention are generally applicable to temperature sensitive elements that employ thin film RTD's, those skilled in the art will recognize that embodiments of the present invention can be practiced with various types of temperature sensors, such as thermocouples, thermistors etc.

Typical industrial RTD designs generally suspend the sensing element in loose MgO powder. The density of the powder fill is important for both vibration resistance and heat transfer. The powder is highly thermally conductive, but it is not completely solid and the air gaps and powder create another layer for heat to transfer through. Contact between a thermowell and sensor capsule is important for time response and accuracy. Spring loaded sensors are the most common capsule assembly and they ensure solid contact between the sensor and the thermowell tip. Thermocouples have superior response time because the sensing junction is generally in very close proximity to the sensor endcap. Grounded thermocouples generally provide the fastest response times because the thermocouple is fused to the endcap or capsule wall near the endcap. Typical sensor capsule assemblies are shown in FIGS. 1A through 1D.

Figure 1A:
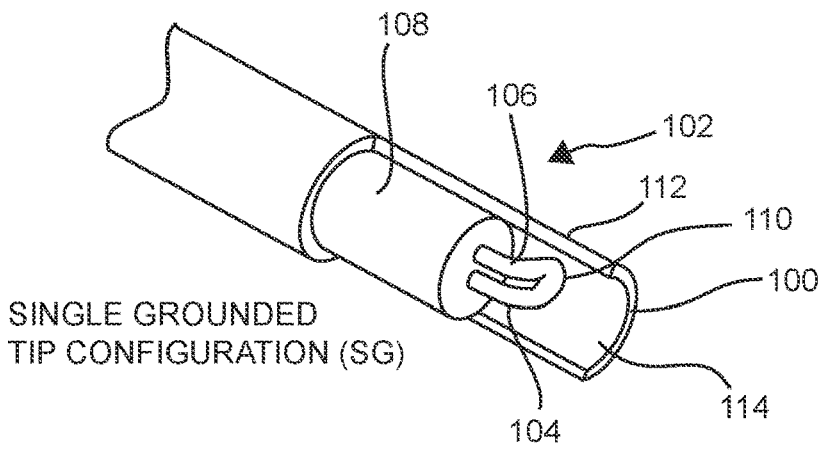
FIGS. 1A-1F are diagrammatic views of portions of known temperature sensor probe designs.

In FIG. 1A, the sensor endcap is removed from end 100 of sensor capsule 102. As can be seen, thermocouple wires 104, 106 extend through MI cable 108. A thermocouple 110 is formed at the junction of dissimilar thermocouple wires 104, 106. This thermocouple tip is grounded (i.e., electrically and mechanically attached to sensor capsule sheath wall 112). The space 114 near the end of sensor capsule 100 is generally filled with an insulative powder, such as MgO or ceramic.

Figure 1B:
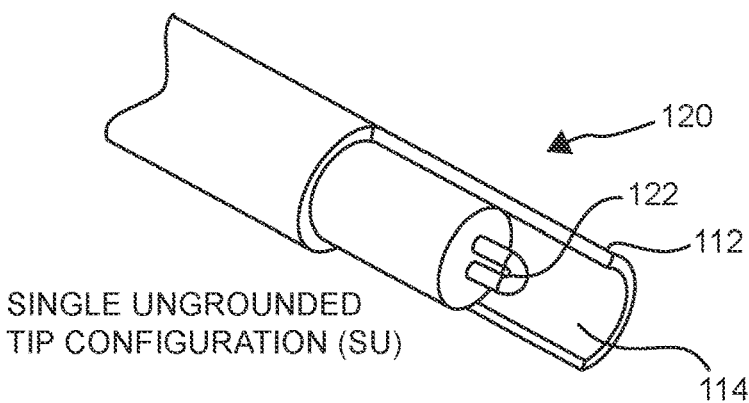

FIG. 1B is a diagrammatic view of a portion of another type of sensor capsule. Sensor capsule 120 is similar to sensor capsule 102 however the thermocouple 122 formed at the junction of the dissimilar thermocouple wires is not grounded to sheath wall 112. Thus, the design shown in FIG. 1B is considered a single ungrounded tip configuration. Mineral insulated powder (e.g. MgO) or ceramic is still provided in space 114 in order to reduce the response time and provide vibration resistance.

Figure 1C:
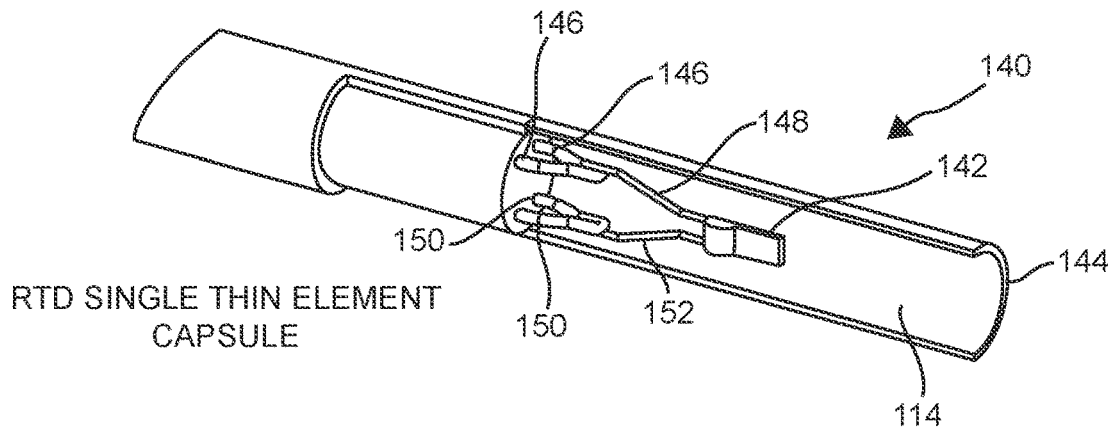

FIG. 1C is a diagrammatic view of a known RTD-based thin film sensor capsule. Sensor capsule 140 generally provides a thin film RTD sensitive element 142 disposed within space 114 near end 144 of sensor capsule 140. Sensor capsule 140 employs a known 4-wire RTD measurement configuration where a first plurality of wires 146 is coupled to a first lead wire 148 of RTD element 142 while a second plurality of wires 150 is coupled to a second lead wire 152 of temperature sensitive element 142. This coupling is generally provided by way of a weld, and the interior of space 114 is then filled with insulative powder to provide thermal conduction and vibration resistance.

Figure 1D:
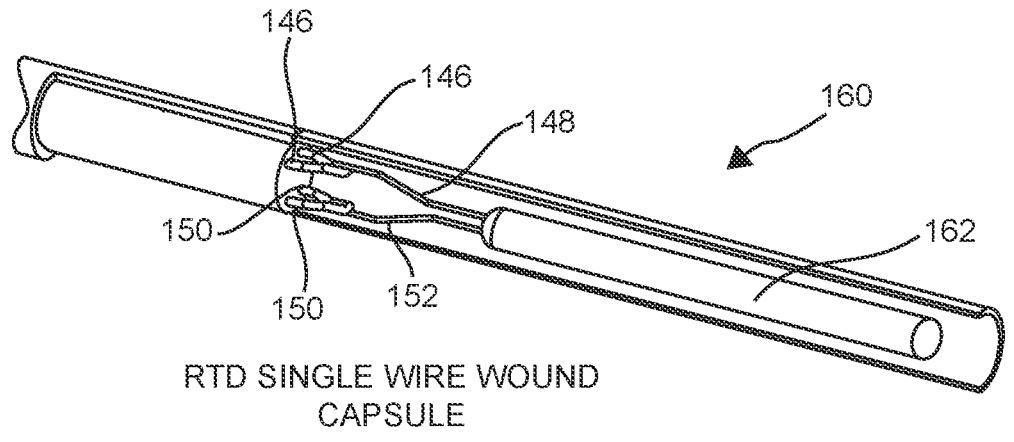

FIG. 1D is a diagrammatic view of another type of known RTD sensor capsule design. Sensor capsule 160 uses a wire wound RTD temperature sensitive element 162 instead of the thin film element 142 (shown in FIG. 1C). Again, a 4-wire connection is used with wires 146 welded to lead wire 148 while wires 150 are welded to lead wire 152.

For temperature probe design, fast response time is generally considered important for improving process control and efficiency. Typically, users may sacrifice some accuracy and stability of RTDs when forced to choose thermocouples for the improved response time. Additionally, RTDs are often considered to be more susceptible to vibration-induced failure. The leading cause of RTD failure in the field is believed to be broken lead wires due to mechanic shock or vibration.

Figure 1E:
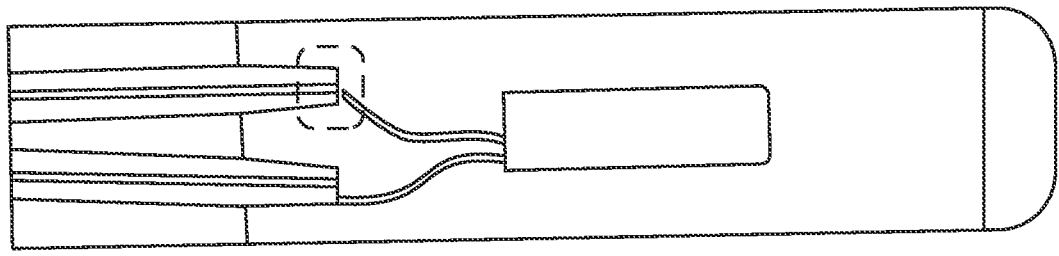
Figure 1F:
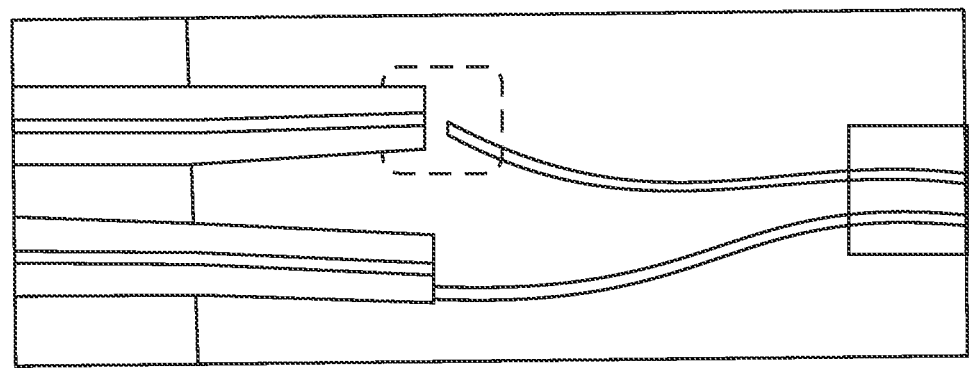

FIGS. 1E and 1F illustrate cross-sectional and enlarged cross-sectional views of a lead wire breakage due to mechanical shock or vibration. RTD's often consist of a platinum sensing element body encapsulated in ceramic and glass with lead wires (typically 0.2 millimeters in diameter) welded to the material-insulated cable conductors (146, 150). The temperature sensitive element is suspended in a metal sheath and filled with loose MgO powder to keep the element from shorting and to prevent excessive movement in the assembly. The mass of the RTD thin film element body causes strain on the thin lead wires during vibration, and while the MgO powder provides some dampening, it is limited. Thermocouples are considered superior in vibration resistance comparison to RTDs because the thermocouple has a robust design of two mineral-insulated cable conductors (over 0.8 mm in diameter) protruding generally a very short distance and then being welded together.

In accordance with embodiments provided herein, a new RTD sensor capsule design replaces a quantity of loose powder with a solid insert. Further, the insert is configured to press the RTD element directly onto the metal sensor end cap. The insert thus positions the element for improved response time, immersion performance, as well as provides strain relief to increase vibration resistance. The sensor insert design provides an option for high vibration and time response without sacrificing accuracy and long-term stability. The material selected for construction of the insert should be electrically insulative in order to avoid issues with the lead wires. Other material for the insert could be used if the wires were provided with their own coated insulation. The thin film portion of the RTD element generally has an electrically insulated layer which allows direct contact with the metal sensor end cap. It would be beneficial for response time if the insert material also had relatively high thermal conductivity in order to promote heat transfer. Ceramic materials would also provide good performance.

Figure 2:
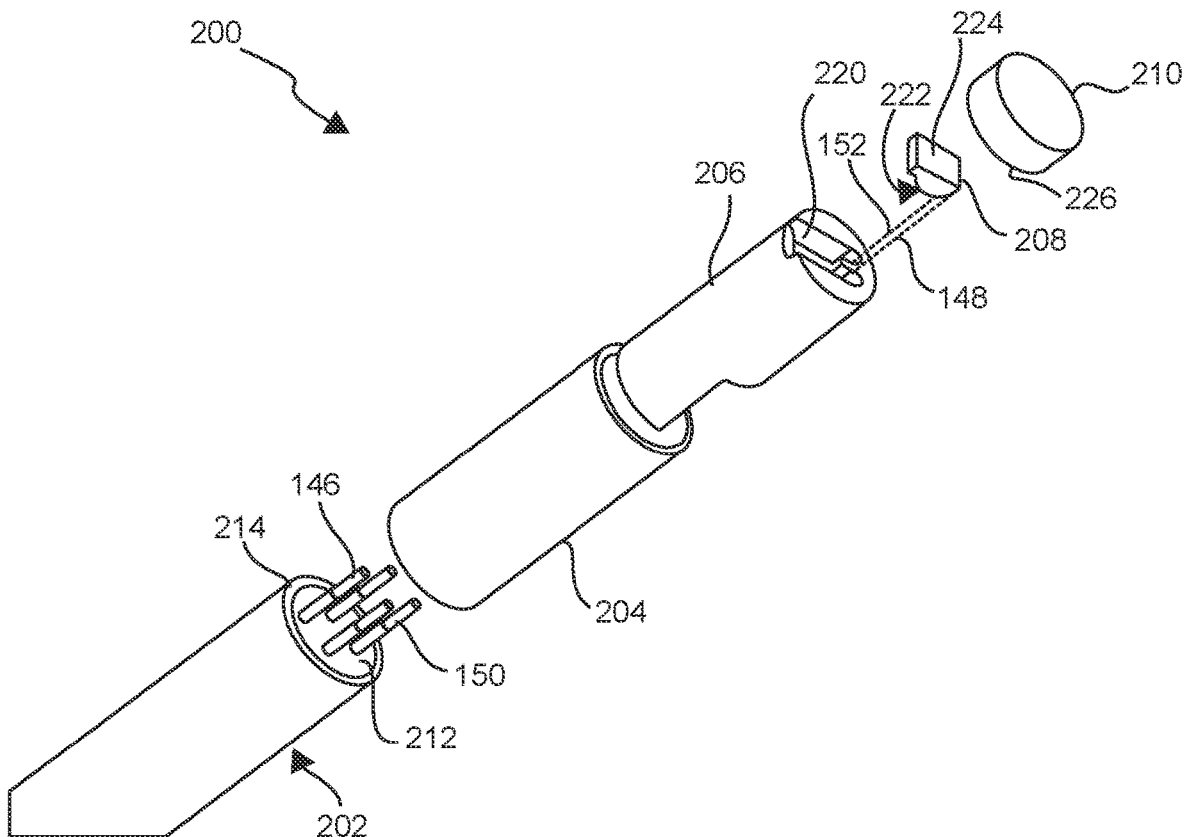
FIG. 2 is a diagrammatic exploded perspective view of a temperature probe in accordance with an embodiment of the present invention.

FIG. 2 is a diagrammatic view of a portion of a temperature probe in accordance with an embodiment of the present invention. Temperature probe 200 generally has a length of metal sheathed mineral-insulated (MI) cable 202, insert sheath 204, insert 206, thin film RTD sensor 208, and end cap 210. Metal sheathed mineral insulated cable 202 may have any suitable number of conductors 146, 150 for providing the desired RTD connection. For example, the number of conductors will typically range between 2 and 4. The conductors run within mineral insulation 212 inside metallic sheath 214, which can be formed of any suitable metal, such as stainless steel. Insert sheath 204 is preferably formed of the same metal as sheath 214 in order to facilitate welding or other suitable bonding methods. Insert sheath 204 is sized to slide over insert 206 once lead wires 148, 152 of thin film sensor 208 are welded to wires 150, 146, respectively. Insert

206 includes a recess 220 that is sized and shaped to received surface 222 of thin film sensor 208 and thus press the opposite flat surface 224 against surface 226 of end cap 210. Construction of probe 200 is completed by welding or otherwise attaching sensor sheath 204 to MI cable 202 and welding or otherwise attaching endcap 210 to insert sheath 204. This results in a very vibration-resistant and thermally responsive RTD-based sensor probe. While embodiments disclosed herein are described with respect to using MI cable, it is expressly contemplated that a functionally similar structure (i.e. insulated conductor wires disposed in a tube or cable with an environmental seal at the sensor insert) may be used in accordance with embodiments of the present invention. Additionally, although FIG. 2 shows insert 206 supporting a single temperature sensitive element (sensor 208), it is expressly contemplated that in some embodiments, insert 206 is configured to support multiple temperature sensitive elements.

Figure 3:
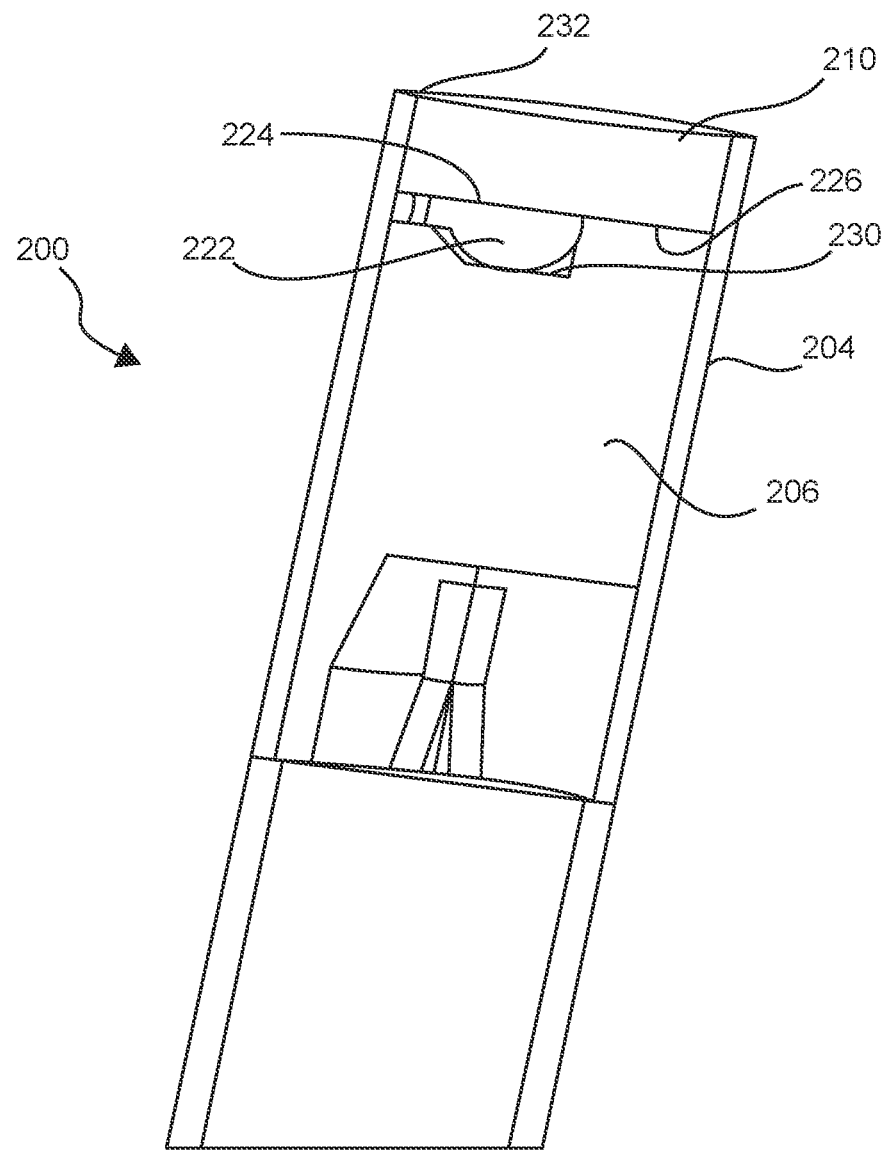
FIG. 3 is an enlarged sectional view of a temperature probe in accordance with an embodiment of the present invention.

FIG. 3 is an enlarged cross-sectional view of a portion of an assembled sensor probe 200 in accordance with an embodiment of the present invention. As can be seen, insert 206 is disposed within insert sheath 204 and provides a surface 230 that urges surface 224 of thin film sensor 222 into contact with surface 226 of endcap 210. In the example shown, endcap 210 is sized to be received by insert sheath 204 and coupling of endcap 210 to insert sheath 204 is provided by a weld generated at interface 232.

Figure 4:
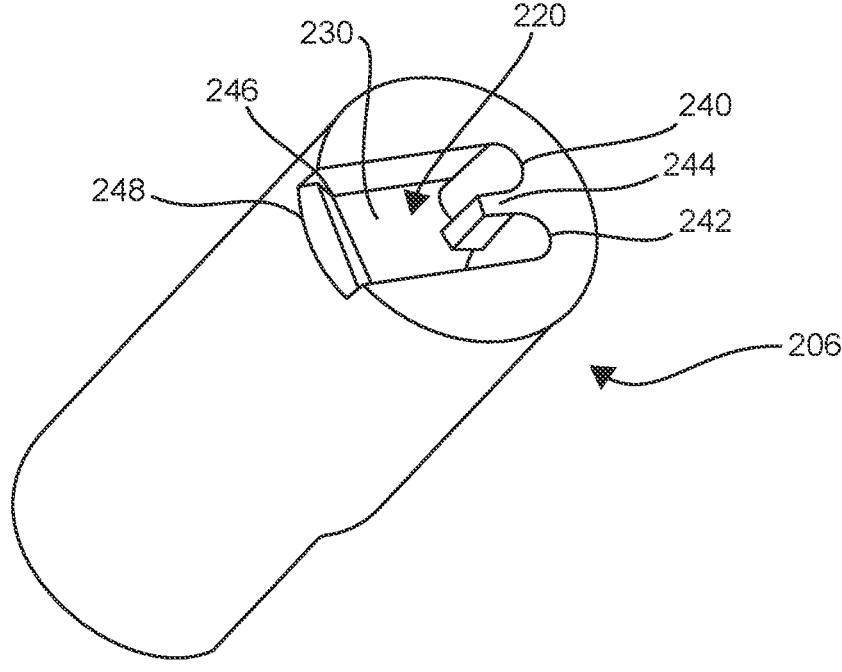
FIGS. 4 and 5 are diagrammatic perspective views of a temperature sensing element mounting insert in accordance with one embodiment of the present invention.
Figure 5:
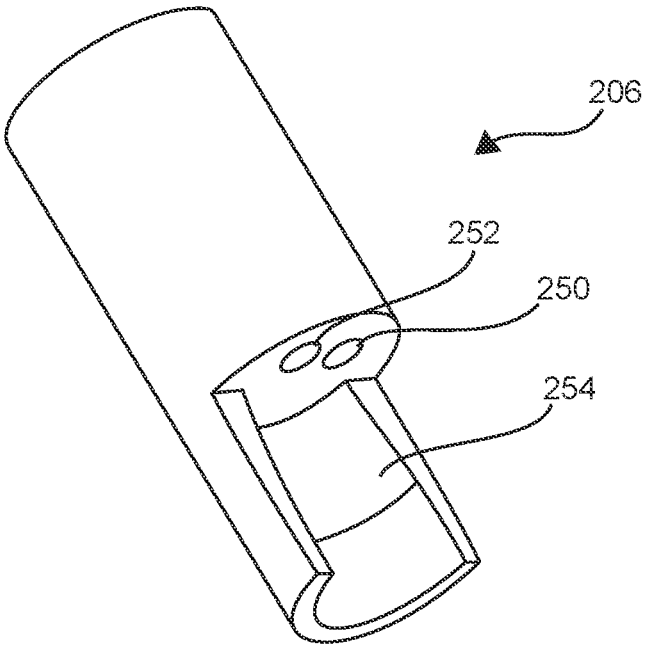

FIGS. 4 and 5 are top and bottom perspective views, respectively, of an RTD temperature sensitive element insert 206 in accordance with an embodiment of the present invention. As shown, insert 206 is generally of a cylindrical shape such that it may be slidably received within insert sheath 204, which has a shape that is also cylindrical such that it can be efficiently coupled to cable 202. Recess 220 has a shape formed by two semi-cylindrical side wells 240, 242, separated by protrusion 244. Flat surface 230 is generally sized to the shape and thickness of the thin film RTD sensor being used. Additionally, recess 220 includes a tapered portion 246 that extends to a small cutout 248 in the sidewall of insert 206. However, other embodiments, tapered portion 246 need not extend to the sidewall of insert 206.

FIG. 5 illustrates a bottom perspective view of insert 206 including a pair of apertures 250, 252 through which lead wires 148, 152 of thin film RTD 142 pass. Those lead wires are then coupled to MI wires 146, 150 in trough region 254.

Figure 6A:
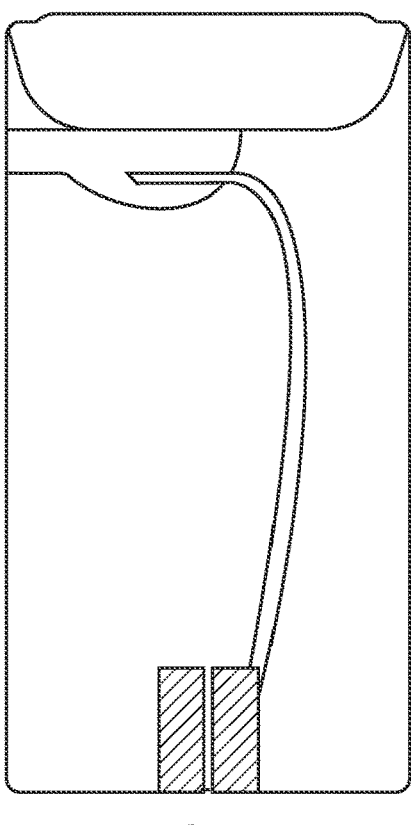
FIGS. 6A and 6B are diagrammatic sectional views of a portion of a temperature sensing probe in accordance with an embodiment of the present invention.
Figure 6B:
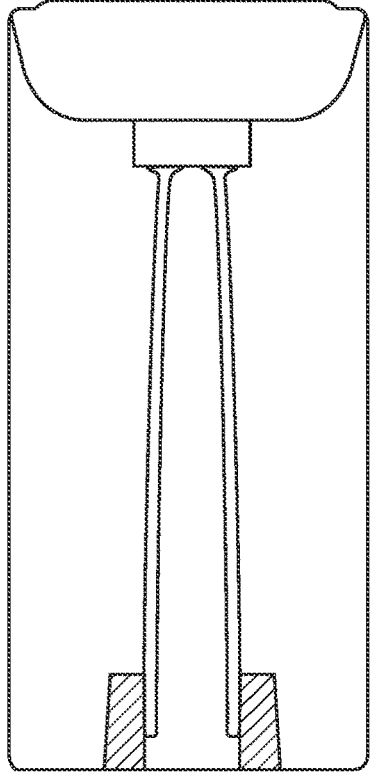

FIGS. 6A and 6B are diagrammatic front and side x-ray images of a prototype RTD sensor employing insert 206 in accordance with an embodiment of the present invention. RTD-based temperature probes utilizing designs and embodiments provided herein were tested and compared to known configurations in terms of response time, and the results are set forth in the FIG. 7. Some assemblies were made with the temperature sensitive element oriented with the flat side toward the sensor endcap and some were made with the flat side oriented away from the sensor end cap. For reference, FIG. 3 shows an embodiment where the flat side of the temperature sensitive element is oriented toward the sensor end cap.

The thin film sensing element is generally positioned flat and in contact with the sensor tip. This positions the sensor optimally to reduce immersion error. This also provides drastic improvements in response time. Positioning the element at the tip of the sensor also provides significant thermal coupling with a thermowell because spring loaded sensors generally are considered to have best contact at the tip.

Figure 7:
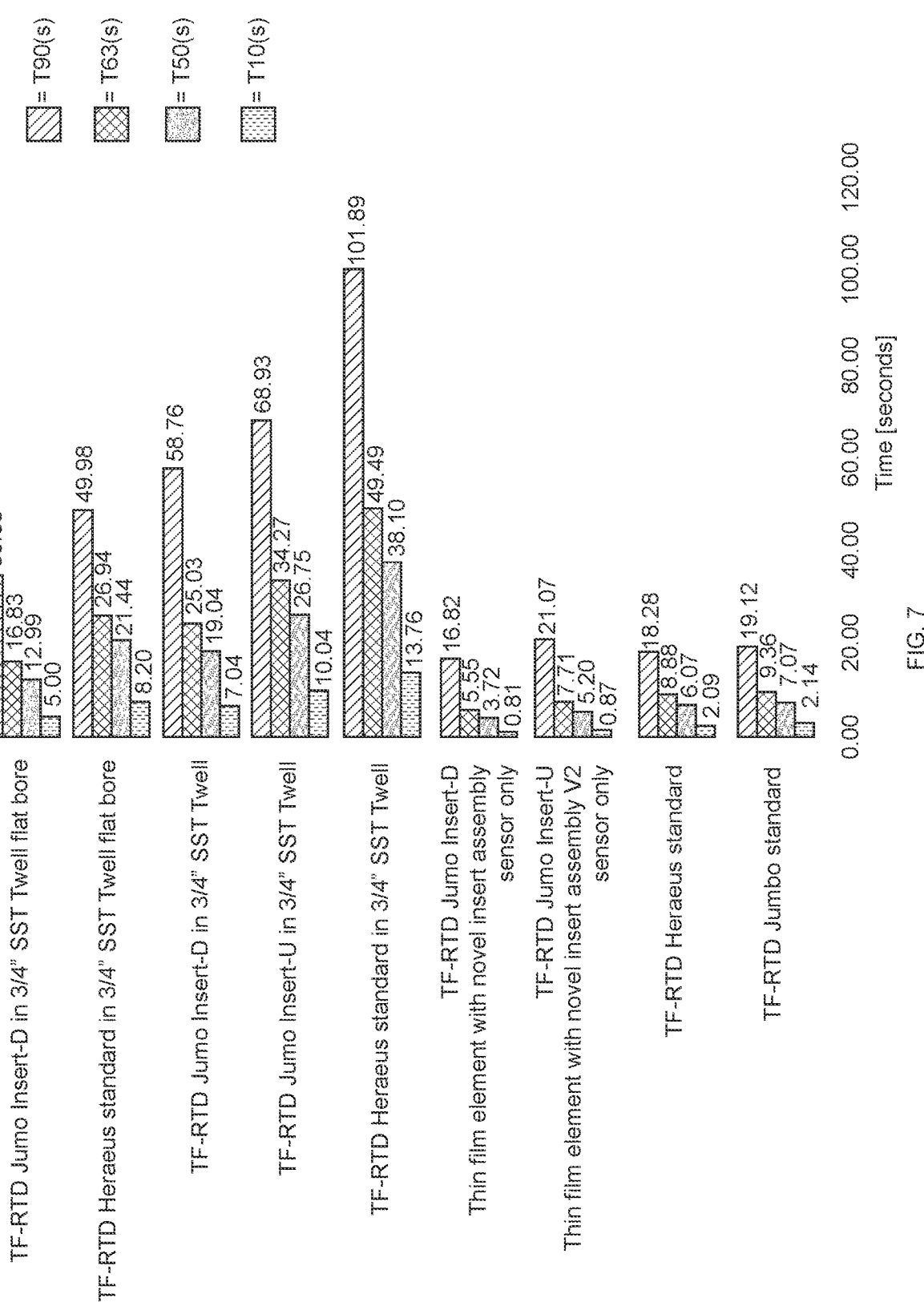
FIG. 7 is a chart illustrating response time for various temperature probes.

Prototypes of embodiments were tested for response time both with and without thermowells and the results are shown in FIG. 7. "TF-Jumo Insert-D" is a prototype with the flat part of the sensing element facing toward the endcap. As shown in FIG. 7, this design had a T90 time of 16.82 seconds, a T63 time of 5.55 seconds, a T50 time of 3.72 seconds, and a T10 time of 0.81 seconds. "TF-Jumo Insert-U" is a prototype with the element oriented in the opposite direction. As can be seen in FIG. 7, this prototype had a T90 time of 21.07 seconds, a T63 time of 7.71 seconds, a T50 time of 5.20 seconds, and a T10 time of 0.87 seconds. "TF-RTD Heraeus standard" is a standard sensor build in accordance with known techniques and provided for reference purposes. As shown in FIG. 7, this sensor had a T90 time of 18.28 seconds, a T62 time of 8.88 seconds, a T50 time of 6.70 seconds, and a T10 time 2.09 seconds. "TF-RTD Jumo Standard" is a standard sensor capsule build that was tested using the Jumo element. This sensor had a T90 time of 19.12 seconds, a T63 time of 9.36 seconds, a T50 time of 7.07 seconds, and a T10 time of 2.14 seconds. As can be seen, "TF-Jumo Insert-D" outperformed all sensors tested. The results are discussed using T63 which is the time it takes the sensor to reach 63% of the temperature difference. T63 is commonly used in the industry when defining response time. Insert-D tested as a bare sensor (i.e. no thermowell) reduced response time by 40% when compare to a standard sensor capsule using the same thin film RTD element. Further, "TF-RTD Jumo Insert-D" was tested in a standard ¾" inch stainless steel thermowell and provided a reduced response time of almost 50% when compared to a known sensor capsule construction ("TF-RTD Heraeus standard in ¾" SST Twell").

The data provided in FIG. 7 also shows testing of a flat bore thermowell. Typically, thermowells have a W geometry from gun drilling the bore diameter. The flat bore thermowell has a geometry machined flat for better contact with the sensor. This thermowell feature provides additional improvements in thermal response time as it increases the contact area between the end of the thermowell and the sensor capsule. The flat bore works well with the sensor insert design described above. "TF-RTD Jumo Insert-D in ¾" SST Twell flat bore" is about three times faster than a standard sensor with a standard bore thermowell (66% reduction).

Embodiments provided herein generally provide vastly improved response times for RTD-based temperature probes. Additionally, embodiments provided herein generally improve the vibration resistance of RTD-based temperature probes. The solid sensor insert is believed to improve vibration resistance for an RTD element. The insert presses the thin film element against the sensor end cap thereby providing strain relief by isolating the element mass from the thin lead wires. The solid design also eliminates powder which can move during vibration period.

Figure 8:
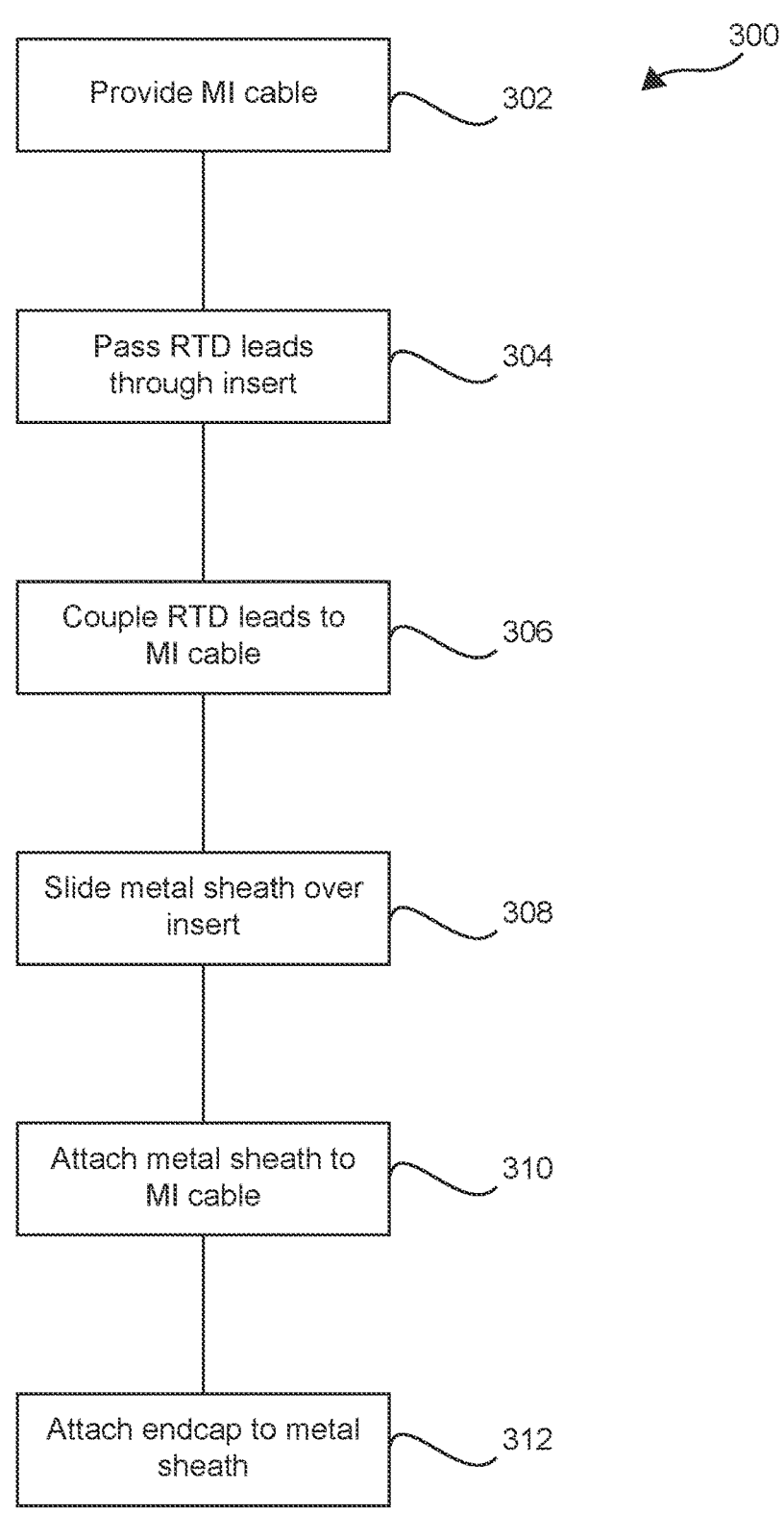
FIG. 8 is a flow diagram of a method of manufacturing a temperature probe in accordance with an embodiment of the present invention.

FIG. 8 is a flow diagram of a method of manufacturing a temperature probe in accordance with an embodiment of the present invention. Method 300 begins at block 302 where an MI cable is provided having a sufficient number of conductors running therethrough. Next, at block 304, a temperature sensitive element, such as a thin film RTD sensor is provided having lead wires that are passed through a plurality of bores of a sensor insert, such as insert 206 (shown in FIG. 5). Next, at block 306, the lead wires of the temperature sensitive element are coupled (e.g. by welding, brazing or soldering) to conductors of the MI cable. At block 308, a metal sheath is slid over the insert. The metal sheath is then attached to the MI cable at block 310. Such attachment can be in any suitable manner, but it is preferred that the metal sheath be formed of the same metal as the outer metallic sheath of the Mi cable and that the attachment be a continuous weld thus not only physically coupling the meatal sheath to the MI cable, but also generating an effective seal. Finally, at block 312, an endcap is attached to the metal sheath. Preferably, the attachment of the endcap also uses a weld to seal the endcap to the metal sheath.

Although the present invention has been described with reference to preferred embodiments, workers skilled in the art will recognize that changes may be made in form and detail without departing from the spirit and scope of the invention.

What is claimed is:

1. A temperature probe comprising:
a mineral-insulated cable having a metallic outer sheath surrounding a mineral insulation therein, the mineral-insulated cable having a plurality of conductors running through the mineral insulation;
a rectangular thin film RTD having a pair of lead wires operatively coupled to the plurality of conductors, the rectangular thin film RTD having an electrically insulative flat surface;
an insert having a plurality of apertures, each aperture being configured to receive a respective lead wire of the rectangular thin film RTD, the insert having a rectangular recess configured to receive the rectangular thin film RTD, wherein the insert includes a trough region where the pair of lead wires is operatively coupled to the plurality of conductors of the mineral insulated cable;
an insert sheath configured to slide over the insert, the insert sheath having a first end configured to couple to the metallic outer sheath of the mineral-insulated cable, the insert sheath also having a second end; and
an endcap attached to the second end of the insert sheath;
wherein the electrically insulative flat surface of the rectangular thin film RTD is in direct contact with the endcap.

2. The temperature probe of claim 1, wherein the rectangular thin film RTD has a first surface that is received within the recess, and the electrically insulative flat surface, which is opposite the first surface, is urged into direct contact with the endcap by the insert.

3. The temperature probe of claim 1, wherein the metallic outer sheath of the mineral-insulated cable and the insert sheath are formed of the same material.

4. The temperature probe of claim 1, wherein the metallic outer sheath of the mineral-insulated cable is welded to the insert sheath.

5. The temperature probe of claim 1, wherein the insert sheath and the endcap are formed of the same material.

6. The temperature probe of claim 1, wherein the insert sheath is welded to the endcap.

7. The temperature probe of claim 1, wherein the endcap is a disc having a first surface in contact with the electrically insulative flat surface of the thin film RTD and an opposite second surface configured to contact a flat bore thermowell.

8. The temperature probe of claim 1, wherein the insert is formed of ceramic.

9. The temperature probe of claim 1, wherein the mineral-insulated cable has a first plurality of conductors coupled to a first lead wire of the RTD and a second plurality of conductors coupled to a second lead wire of the RTD.

10. The temperature probe of claim 9, wherein the first plurality of conductors is welded to the first lead wire of the RTD and the second plurality of conductors is welded to the second lead wire of the RTD.

11. The temperature probe of claim 1, wherein the recess includes a pair of semi-cylindrical wells, each configured to receive a respective lead wire of the rectangular thin film RTD.

12. The temperature probe of claim 11, and further comprising a protrusion separating the pair of semi-cylindrical wells.

13. The temperature probe of claim 1, wherein the recess includes a taper portion.

14. The temperature probe of claim 13, wherein the taper portion extends to a cutout of the insert.

15. The temperature probe of claim 1, wherein the pair of lead wires is welded to the plurality of conductors of the mineral insulated cable.

16. The temperature probe of claim 15, wherein the lead wires of the rectangular thin film RTD have a diameter of about 0.2 mm.

17. The temperature probe of claim 16, wherein the rectangular thin film RTD is formed of a platinum sensing element body encapsulated in ceramic and glass.

* * * * *